United States Patent Office 3,326,694
Patented June 20, 1967

3,326,694
PROCESS FOR MAKING CRANBERRY SAUCE
Stanley I. Skelskie, Brockton, Mass., assignor to Ocean Spray Cranberries, Inc., Hanson, Mass., a corporation of Delaware
No Drawing. Filed Mar. 2, 1965, Ser. No. 436,634
4 Claims. (Cl. 99—102)

This invention relates to the preparation of cranberries for marketing and more specifically to a process for preparing an improved cranberry sauce of the type referred to in the trade as a strained or jellied sauce, and to the resulting product.

It is an object of the invention to produce a cranberry sauce which has deeper red color and better gelled qualities than sauces presently made only from second or strained sauce grade raw cranberries.

In accordance with this invention, cranberries are sorted as at present to segregate those cranberries with high natural color and flavor which are the cranberries required for cranberry juice cocktail. This selected grade of cranberries is then processed in the usual cocktail manner, for example as described in U.S. Patent No. 3,023,108, with or without cyclic pre-freezing as therein described. Such processing involves pressing the cranberries to a low liquid content as in a Carver Press at room temperature and under pressures up to 4,000 p.s.i., leaving a moist pulp which is presently discarded for lack of any commercial utility.

It has now been found that considerable cranberry values, including pectin, color, flavor and soluble solids, remain in these presently discarded pressed cranberries and that these values, when utilized in the preparation of strained cranberry sauce, decidedly upgrade the resulting sauce with respect to color, flavor, and consistency, and lessen the weight of whole secondary grade cranberries required per unit of production.

A typical process in accordance with this invention is as follows:

A quantity of highest grade raw cranberries were crushed at room temperature in a Carver Press to extract 75–80 cc. per 100 grams of cranberry of natural juice which was subsequently diluted with water and sweetened with sugar to provide a deep crimson red cranberry cocktail.

90 parts by weight of light and mixed colored second grade whole cranberries were placed in 100 parts by weight of water to which was added 6 parts by weight of the pressed pulp of the superior grade cranberries from which the pressed out juice had been separated. The aqueous suspension was then heated to a temperature between 185° and about 210° F. The mixture, while still hot, was strained through a finisher screen with a hole size of approximately .027" to .033" to reduce the average size of the contained particles and to remove seeds and skins.

The resulting puree, which amounted to approximately 186 parts by weight, was boiled with 250 parts by weight of a blended sugar-corn syrup at 80° Brix until the Brix had reached 37°–40°. The hot mix was then filled into consumer size cans and cooled in accordance with usual practice, yielding approximately 280–300 parts by weight of jellied sauce having a deeper color and firmer gel structure than would be present without the addition of the pressed cranberry pulp.

Instead of screening, the seeds, skins and other solid particles may be comminuted to a fine particle size as by passing the suspension through a suitable comminutor, disintegrator or mill.

What is claimed is:
1. The process of making a cranberry sauce comprising pressing superior grade cranberries to press out natural juices therefrom, leaving a low liquid content crushed pulp, adding the crushed pulp to an aqueous suspension of second grade cranberries, heating the suspension, treating the suspension to reduce the average size of particles contained therein, adding a sugar syrup, boiling the syrup suspension and then cooling the boiled mixture to gel the product in the form of a jellied cranberry sauce.

2. The process as claimed in claim 1 wherein the average particle size is reduced by straining the suspension.

3. The process as claimed in claim 1, wherein the average particle size is reduced by comminuting the solids contained therein.

4. The process as claimed in claim 1, wherein the suspension is heated to a temperature between 185° F. and about 210° F. before addition of the sugar syrup.

No references cited.

A. LOUIS MONACELL, *Primary Examiner.*

M. VOET, *Assistant Examiner.*

Dedication 3,326,694.—*Stanley I. Skelskie*, Brockton, Mass. PROCESS FOR MAKING CRANBERRY SAUCE. Patent dated June 20, 1967. Dedication filed Jan. 13, 1975, by the assignee, *Ocean Spray Cranberries, Inc.*

Hereby dedicates to the Public all claims thereof, for the remainder of the term of said patent.

[*Official Gazette March 25, 1975.*]